United States Patent [19]
Smith, Jr.

[11] 3,807,867
[45] Apr. 30, 1974

[54] METHOD AND APPARATUS FOR INSPECTING SURFACE TREATED OPHTHALMIC LENSES

[75] Inventor: Luther W. Smith, Jr., Brimfield, Mass.

[73] Assignee: American Optical Corporation, Southbridge, Mass.

[22] Filed: Jan. 31, 1973

[21] Appl. No.: 328,221

[52] U.S. Cl............ 356/114, 356/135, 350/175 GN
[51] Int. Cl. ........................................... G01n 21/40
[58] Field of Search...350/96 WG, 158, 166, 175 GN; 356/114, 124, 125, 126, 127, 128, 135, 136, 118; 65/30; 161/1, 2, 3.5

[56] References Cited
UNITED STATES PATENTS 3,286,581   11/1966   Acloque et al. .................... 350/96
3,357,876   12/1967   Rinehart ............................. 161/1

Primary Examiner—Ronald L. Wibert
Assistant Examiner—Conrad Clark
Attorney, Agent, or Firm—Bernard L. Sweeney; William C. Nealon

[57] ABSTRACT

Glass ophthalmic lenses which have been treated by a process of ion exchange provide increased impact resistance and durability. It is necessary that these lenses be inspected to ascertain that the desired penetration of the ion exchange process has occurred prior to dispensing the lenses to the public. This may now be accomplished in photochromic borosilicate lenses by introducing into the hardened exterior layer of the convex surface light waves at essentially grazing refraction. If the rays transmitted through the exterior layer are all polarized in a common direction, the lens has been subjected to the ion exchange process.

14 Claims, 2 Drawing Figures

METHOD AND APPARATUS FOR INSPECTING SURFACE TREATED OPHTHALMIC LENSES

BACKGROUND OF THE INVENTION

This invention is related to the inspection of surface treated glass ophthalmic lenses and is more particularly concerned with novel improved method and apparatus for inspecting such surface treated glass ophthalmic lenses of the photochromic borosilicate type which have been treated in an ion exchange chemical hardening process.

Recent regulations which have been promulgated by the Federal Food and Drug Administration require that all prescription ophthalmic lenses dispensed within the United States pass certain impact-resistance tests. The principal thrust of these regulations is to enhance greatly the impact-resistance of glass ophthalmic lenses so as to safeguard against injury to the eyes of the wearer. In order to meet these regulations and yet not form ophthalmic lenses of prohibitive thicknesses, it has become necessary to treat the ophthalmic lenses to improve their impact-resistance characteristics.

A fracture in glass always originates at a surface that is in tension and, in general, the degree of tension required to cause failure is controlled by the presence of surface flaws. Thus, the strength of a piece of glass is determined by the strength of its surface. For this reason, the strength of annealed glass can be expressed in terms of a critical, or basic, tensile strength which is dependent upon the severity of the surface flaws. With strengthened glass, however, the built-in stresses have to be considered in addition to the basic strength of the surface.

Thermally tempered glass is produced by rapidly cooling glass which has been heated to near the softening point. Glass treated in this manner is characterized by having compressive stress in the surface while the interior of the glass is under tensile stress. The highest value of the compressive stress occurs at the surface of the glass where it plays a major role in determining the strength of the glass article. The overall strength can be expressed as the sum of the basic strength plus the surface compressive stress induced by the tempering process.

A second major method for forming a compressively stressed surface layer in glass articles is a method known commonly as ion exchange. Simply stated, an ion exchange process involves the substitution of a larger monovalent alkali metal ion for a smaller monovalent alkali metal ion in the surface layer of a glass article. This substitution of large ions for small ions causes the surface layer of the glass article to become more densely packed than the interior thereby helping to create a highly compressively stressed layer on the surface while the interior portion of the glass article is tensilely stressed. Another factor which often simultaneously contributes to the compressively stressed condition is the alteration of the thermal expansion coefficient caused by the modified composition of the surface layer.

Neither of the foregoing methods alter the appearance of the lens sufficiently so that the presence or absence of the treated surface may be ascertained visually even to one of high skill. Therefore, a method is necessary to determine positively that the lenses have been treated. In the case of the commercially available thermally tempered lenses, this presents no problem as, characteristically, glass, when it is stressed, becomes somewhat birefringent. Thus, present methods for thermally tempering lenses leave the lens with a pattern of stress that is distributed as a compressively stressed surface layer and a tensilely stressed interior. The degree of compression is highest at the surface and is progressively less at points inward from the surface toward the interior. In addition, the degree of compression of the surface varies over the surface. Typically, the highest compressive stresses occur in a region at or near the center of the lens surface with progressively lower compressive stresses in the surface at points progressively closer to the rim of the lens. That is, there is a radial distribution of stress as well as a distribution in thickness. This radial distribution causes a characteristic pattern of polarization interference fringes to occur when the treated lens is held between crossed polarizers. If one attempts to apply the same procedure to lenses that have been strengthened in the ion exchange process, similar results do not occur. This is explained by the fact that the compressively stressed surface layer in the chemically treated lens is quite uniform over the entire surface of the lens though the degree of compression is still highest at the surface and less progressively at points inward from the surface toward the interior, i.e., there is a gradient through the thickness of the lens, but none radially. Thus, a ray traversing through the lens exits with very little net polarization retardation because the effect of the uniformly distributed compressive surface layers is almost entirely cancelled out by that of the tensilely stressed interior, whereas the cancellation is not nearly as perfect with the radial distribution of stress induced in thermally tempered lenses. Hence, the method of using crossed polarizers does not serve as a practical means of examining chemically tempered lenses.

In my co-pending application, Ser. No. 266,193, filed June 26, 1972, there is described method and apparatus for determining whether an ion exchange hardened layer is present on the lenses where the layer has an index of refraction higher than the underlying body of the lens. This invention utilizes the fact that the hardened surface layer can act as a waveguide for the transmission of light energy. Hence, by determining whether such energy can be transmitted along the surface, one acquires a positive indication of the presence or absence of the layer.

However, in ophthalmic lenses formed from certain base glasses, the hardened surface layer does not have an index of refraction higher than that of the interior of the lens. Generally, this is the result of offsetting trends caused by the process. The introduction of larger ions into the surface layer sets up compressive stress in the surface layers of the lens, a stress which is relieved in the direction perpendicular to the surface by a slight deformation of the lens but which remains unrelieved in the plane of the surface because of the counter-acting forces of the interior portions of the lens. This compressive stress in the plane of the surface tends to raise the index of refraction for light propagating in the surface layer with its direction of vibration perpendicular to the surface layer (hereafter called ordinary rays) while the index of refraction for light propagating in the layer with its direction of vibration in the plane of the layer (hereafter called extraordinary rays) remains unchanged. These trends are disturbed for certain base glasses by a trend toward a decrease in the index of refraction for both mentioned directions of vibration as a result of the altered chemical composition of the surface layer. For example, in the photochromic borosilicate glass lenses which are widely used today, the trends essentially cancel each other for ordinary rays in the surface layer so that the surface layer is birefringent with an index of refraction for ordinary rays essentially equal to that of the interior of the lens and an index of refraction for extraordinary rays which is lower than that of the interior of the lens. The surface layer, therefore, cannot act as a waveguide for optical radiation.

In addition, it is foreseeable that situations will arise where the index of refraction for the extraordinary rays will be higher than the index of refraction for the ordinary rays and where the index of refraction for the ordinary rays will be equal to or lower than the index of refraction for the underlying substrate. Therefore, in this specification, reference to a ray of principal polarization will refer in the alternative to either an ordinary ray or an extraordinary ray.

SUMMARY OF THE INVENTION

Accordingly, it is an object of the present invention to provide a method and apparatus for determining positively whether a piece of glass has been subjected to a surface treatment where that treatment has resulted in a surface layer having essentially an index of refraction for a ray of principal polarization which is equal to or lower than the index of refraction for the interior of the lens.

It is a second object of the invention to provide a method and apparatus for inspecting an ophthalmic lens which has been subjected to a surface treatment where the index of refraction for the extraordinary rays is less than the indices of refraction for both the ordinary rays and the interior of the lens.

It is another object of the invention to provide a method and apparatus which are suited particularly for inspection of such ophthalmic lenses which have been subjected to an ion exchange surface treatment process.

Another object of the invention is to provide such a method and apparatus which is particularly suited for the inspection of lenses formed of photochromic borosilicate glass for the presence of a layer formed by an ion exchange surface treatment process.

A further object is to provide such a method and apparatus which are simple in operation and construction respectively.

A still further object is to provide such a method and apparatus which provide to the operating technician a simple "go-no-go" test for the presence of such a surface treated layer on an ophthalmic lens.

Briefly, the invention, in its broadest aspect, comprises method and apparatus for inspecting a piece of glass for the presence of an outer surface treated layer on a convexly curved refractive surface of the piece of glass. The outer surface treated layer has an index of refraction for a ray of a first principal polarization which is essentially equal to or lower than the index of refraction of the interior of the ophthalmic lens. The index of refraction for a ray of the second principal polarization is higher than the index of refraction for a ray of the first principal polarization. A launcher member is placed in optical contact with the convexly curved refractive surface and is formed of an optical material having a higher index of refraction than the outer surface treated layer for any ray of principal polarization. An amount of an optically clear intermediate fluid is placed between the refractive surface and the launcher member sufficient to create good optical contact therebetween. The intermediate fluid has an index of refraction higher than that of the outer surface treated layer for any ray of principal polarization. The fluid forms a first interface with the outer surface treated layer. A beam of light is directed onto an entrance window on the launcher member. The direction of this beam of light is adjusted both within and without the launcher member to cause rays in the beam of light to approach the first interface at an angle between the critical angles of total internal reflection for rays of the first and second principal polarizations. These angles are determined by the refractive indices of the optically clear intermediate fluid and the outer surface treated layer for the rays of the first and second principal polarizations. A receiver member, again formed of an optical material having a higher index of refraction than the outer surface treated layer for any ray of principal polarization is placed in contact with the convexly curved refractive surface. An amount of the optically clear intermediate fluid is placed between the refractive surface and the receiver member to create optical contact therebetween. The intermediate fluid thereby forms a second interface with the outer surface treated layer. The receiver member is positioned so as to be aligned with any rays of the first principal polarization from the beam refracted at nearly grazing refraction at the first interface and passing through the outer surface treated layer. When the radiation reaches the receiving member, the rays are refracted through the second interface and pass through the receiver member. A polarizer is positioned so that its plane is essentially normal to the rays passing through the receiver member and is oriented such that rays of the first principal polarization are absorbed. The presence of rays passing through the polarizers is then detectable. The presence thereof indicates that no outer surface treated layer is present on the piece of glass.

Further objects, advantages and features of the invention will be apparent in the arrangement of the constituent parts, in detail, as set forth in the following specification taken together with the accompanying drawing.

DETAILED DESCRIPTION OF THE PREFERRED EMBODIMENTS

Figure 2:
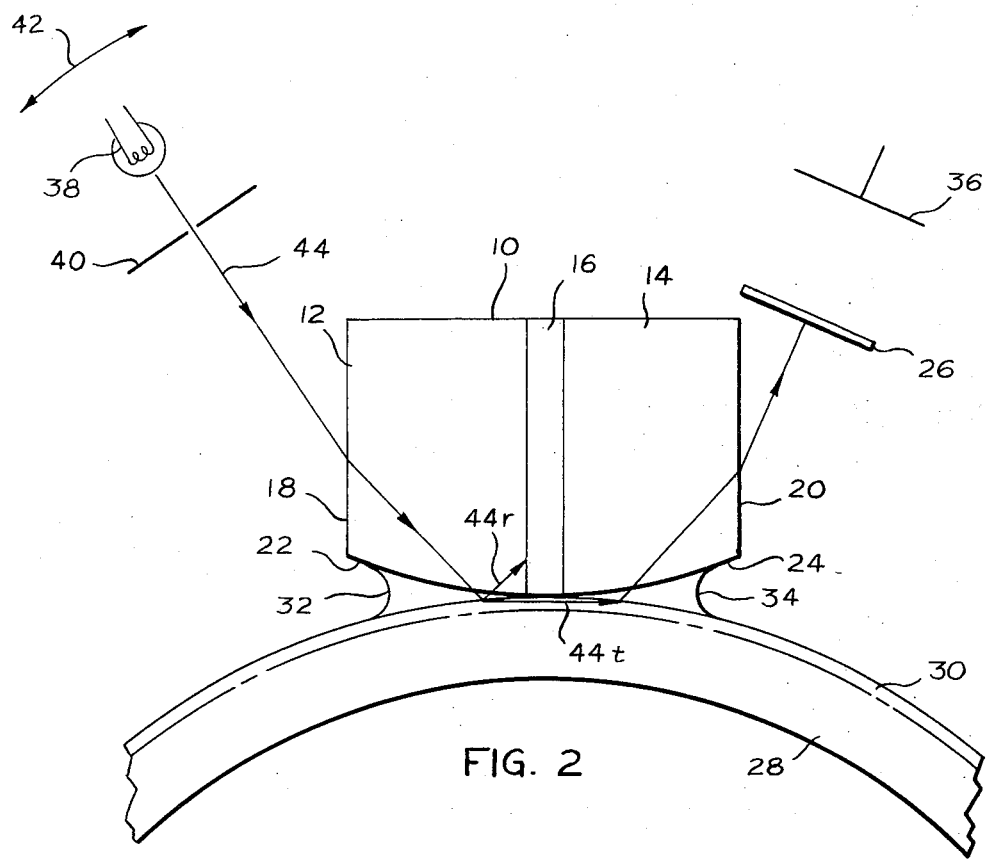
FIG. 2 is a partially schematic, side elevation view of the transducer member of FIG. 1 showing the principles of operation of the present invention.

In describing the principles and embodiments of the present invention with reference to the accompanying drawing, like reference numerals will be utilized to identify similar elements of the apparatus.

Figure 1:
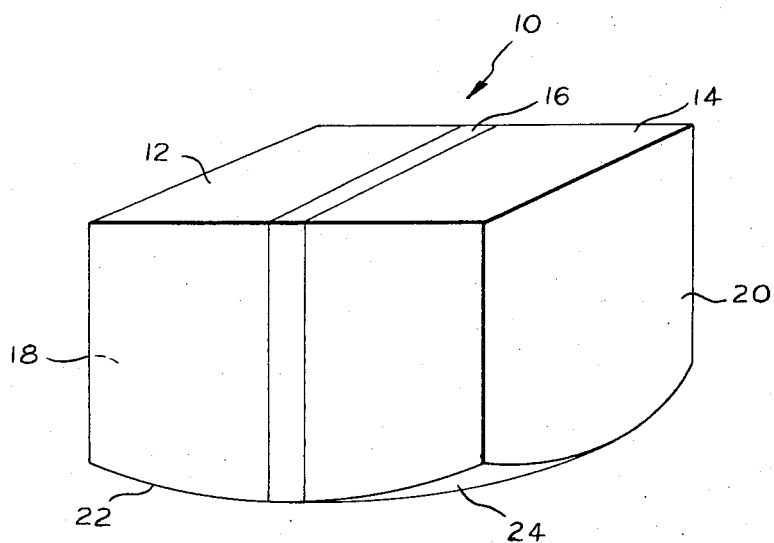
FIG. 1 is an oblique pictorial view of a transducer member useful in the practice of the present invention.

Referring initially to FIG. 1 of the drawing, there is shown a preferred embodiment of a transducer member indicated by the reference numeral 10 which is central to the inventive concept set forth herein. The transducer member 10 is comprised of three major elements, a launcher member 12, a receiver member 14, and an interposed light-absorbing baffle 16. A polished entrance window 18 is formed on the launcher member 12 and, in like manner, a polished exit window 20 is formed on the receiver member 14. The bottom surface 22 of the launcher member 12 and the bottom surface 24 of the receiver member 14 are formed on a common spherical surface. In this embodiment, the light-absorbing baffle 16 extends to the common spherical surface containing surfaces 22 and 24. However, it is not necessary that the baffle extend to the common spherical surface.

The transducer member 10, as shown in FIG. 1, is emplaced, see FIG. 2, on the convexly curved side of a piece of glass 28 which is to be examined for the presence of the surface treated layer 30. The piece of glass 28 is generally an ophthalmic lens and will be so referred to hereinbelow. Amounts 32 and 34 of an intermediate optically clear fluid sufficient to fill the gaps are placed between the launcher and receiver members 12 and 14 to provide good optical contact between the members and the surface of the lens 28.

The refractive index of the intermediate fluid must be higher than the refractive index of the outer surface treated layer 30 for any ray of principal polarization, i.e., for either ordinary or extraordinary rays. The refractive index of the intermediate fluid should be either equal to or less than those of the launcher and receiver members 12 and 14. Therefore, the refractive indices of the launcher and receiver members 12 and 14 also must have indices of refraction higher than the outer surface treated layer for any ray of principal polarization.

A narrow beam of light 44 is derived from a source 38 and an associated diaphragm 40. The direction of this beam is fully adjustable as indicated generally by the double-headed arrow 42. The beam of light is directed onto and through the entrance window 18 on the launcher member 12. The beam 44 traverses the launcher member 12, passes into the intermediate fluid 32, and strikes the first interface which is formed by the intermediate fluid 32 and the outer surface treated layer 30 on the lens 28. The direction of the beam 44 is adjusted so as to cause it to strike the first interface at an angle between the critical angles of total internal reflection for rays of the first and second principal polarizations as determined by the refractive indices of the optically clear intermediate fluid 32 and the lens material at the surface thereof for the rays of both principal polarizations. At least a portion of the beam 44t is refracted at nearly grazing refraction through the surface of the lens 28, and strikes a second interface between the surface and the amount 34 of the optically clear fluid under the receiver member 14. At the second interface, the transmitted light is refracted into the receiver member 14 and passes through the exit window 20 where it may be detected by detecting means 36.

If the lens is, for example, a photochromic borosilicate lens that has been ion-exchange treated in a mixed ($NaNO_3$—$KNO_3$) salt bath, the band of light in the detector will be almost completely linearly polarized with the direction of vibration of the E-vector in the plane of incidence, i.e., only the ordinary ray reaches the receiver member 14. All other combinations of lens material and hardening treatment — even thermal tempering by concentrated air jets — leave the beam almost completely unpolarized since in all other instances the outer surface treated layer had an index of refraction for both rays of principal polarization equal to or greater than the interior of the lens. The degree of polarization is easily detected by inserting a linear polarizer 26 in the beam from the receiver member 14 and orienting it so as to absorb the vibrations of the ordinary rays. If a portion of the beam is still visible, it must contain appreciable amounts of light vibrating in other directions, i.e., extraordinary rays, and the lens is not an ion-exchange treated photochromic borosilicate lens. If the beam is essentially totally absorbed, the lens is an ion-exchange treated photochromic borosilicate lens.

The explanation of this polarization of the transmitted light is based on two experimentally observed facts about the photochromic borosilicate glass: (a) The refractive index for light polarized to vibrate perpendicular to the surface of an ion-exchange treated lens is left virtually changed (error of ±0.0002) from that in the untreated lens while the index for light polarized to vibrate parallel to the surface is lowered by 0.0004 ± 0.0002. (These values were measured on a flat piece of a photochromic borosilicate lens with an Abbe refractometer); (b) the light within the ion-exchange treated lens during a measurement with the apparatus is linearly polarized. (This was observed on a sectioned and polished lens placed in the apparatus so that (polarized) light could be seen exiting from the cut edge at the same time that the polarized light signal was seen in the detector). It appears, then, that the refractive index is lowered in the photochromic borosilicate glasses by the ion-exchange treatment due to the change in composition. But, because of the compressive stress left in the ion exchange layer by the "ion-stuffing," the index of refraction for light polarized with its direction of vibration perpendicular to the lens surface (ordinary rays) is left virtually unchanged with the index of refraction for light polarized with its direction of vibration parallel to the lens surface (extraordinary rays) is lowered by approximately 0.0004. Therefore, it is possible by adjusting the angle of incidence of the light 44 striking the lens in the higher index fluid 32 under the launcher member 12 to cause ordinary rays to be refracted across the vertex of the lens underneath the absorbing barrier 16 while the extraordinary rays 44r are totally internally reflected back into the fluid and launcher where they are observed by the barrier 16. For untreated lenses, all directions of polarization travel a common path and are all reflected or are all transmitted to form an unpolarized beam in the receiver 14. For ion-exchange treated ophthalmic crown lenses and all thermally quenched lenses where the index is elevated by the change in composition and/or compression, it appears that an adjustment that causes reflection of the extraordinary rays at the first interface also causes reflection of the ordinary rays but at the ion-exchange layer — bulk glass interface so that either both rays are reflected or they both go through.

If the lens 30 is formed of a material such as standard ophthalmic crown glass where the indices of refraction for both rays of principal polarization in the outer surface treated layer 28 are equal to or higher than that of the interior of the lens and one attempts to utilize the apparatus and method of the present invention, the result is simply that either both rays of principal polarization reach the receiver member or neither reach the receiver member. The reason for this phenomena is that, although the outer surface treated layer has differing indices of refraction for the two principal polarizations, if only one of the rays of principal polarization enters the outer surface treated layer, that ray is refracted back to the surface within a few wavelengths. This immediate refraction out of the the layer occurs because a gradient of refractive index from a maximum at the surface to a minimum in the interior exists in these lenses. Therefore, no light reaches the receiver member. If the direction of the lightbeam 44 is adjusted sufficiently that light reaches the receiver member 14, it is found that neither critical angle has been reached or exceeded and both principal polarizations now reach the receiver member.

Although the principles of this invention apply equally irrespective of relative relationship of the two rays of principal polarization, it should be understood that in at least the majority of instances where the invention can be utilized that the magnitude of the index of refraction for the ordinary ray is higher than that for the extraordinary ray. This results in these instances in having the polarizer 26 oriented to absorb the ordinary ray.

In the foregoing discussion, the transducer member 10 has been considered to be an integral unit. However, the launcher and receiver members 12 and 14 may be separate and the baffle 16 need not be included. Obviously, the launcher and receiver members cannot be widely separated since the refracted ray 44t are not present in the surface layer 30 of the lens 28 for a great distance due to the inherent thinness of the layer 30. The absorbing baffle 16 serves merely to prevent unwanted light from other sources from being present at the detector and possibly confusing the results of the tests. Furthermore, any other means for preventing any light from passing from the launcher member to the receiver member other than through the outer surface treated layer may also be used.

While there have been shown and described what are considered to be preferred embodiments of the present invention, it will be obvious to those skilled in the art that various changes and modifications, such as the inclusion of curved or inclined windows on the launcher and receiver members or the utilization of either planar or curved reflective surfaces in conjunction with the various refractive surfaces, may be made therein without departing from the invention.

I claim:

1. A method for inspecting a piece of glass for the presence of an outer surface treated layer on a convexly curved refractive surface of the piece of glass, where the outer surface treated layer has an index of refraction for a ray of first principal polarization which is equal to or lower than the index of refraction of the interior of the piece of glass, the index of refraction for a ray of the second principal polarization in the outer surface treated layer being higher than the index of refraction for a ray of the first principal polarization, the method comprising the steps of:

placing a launcher member in contact with the convexly curved refractive surface, the launcher member being formed of an optical material having a higher index of refraction than the outer surface treated layer for any ray of principal polarization;

placing an amount of an optically clear intermediate fluid between the refractive surface and the launcher member sufficient to create optical contact therebetween, the intermediate fluid having an index of refraction higher than the index of refraction of the outer surface treated layer for any ray of principal polarization, the fluid forming a first interface with the outer surface treated layer;

directing a beam of light onto an entrance window on the launcher member;

adjusting the direction of the beam of light both within and without the launcher member to cause rays in the beam of light to approach the first interface at an angle between the critical angles of total internal reflection for rays of the first and second principal polarizations as determined by the refractive indices of the optically clear intermediate fluid and the outer surface treated layer for the rays of the first and second principal polarizations;

placing a receiver member in contact with the convexly curved refractive surface, the receiver member being formed of an optical material having a higher index of refraction than the outer surface treated layer for any ray of principal polarization;

placing an amount of the optically clear intermediate fluid between the refractive surface and the receiver member to create optical contact therebetween, the intermediate fluid forming a second interface with the outer surface treated layer;

positioning the receiver member so as to be aligned with any rays of the first principal polarization from the beam refracted at nearly grazing refraction at the first interface and passing through the outer surface treated layer, the rays entering through the second interface and passing through the receiver member;

positioning a polarizer whose plane is essentially normal to the rays passing through the receiver member, the polarizer being oriented such that rays of the first principal polarization are absorbed; and detecting the presence of any radiation passing through the polarizer, the presence thereof indicating that no outer surface treated layer is present on the piece of glass.

2. The method according to claim 1, wherein the rays of the first principal polarization are ordinary rays and the rays of second principal polarization are extraordinary rays, the index of refraction for the ordinary rays being less than the index of refraction of the interior of the piece of glass.

3. The method according to claim 2, further including the step of forming the beam of light into a narrowly divergent beam.

4. The method according to claim 2, further including the step of preventing any light from passing from the launcher member to the receiver member other than through the outer surface treated layer.

5. The method according to claim 4, wherein light is prevented from passing from the launcher member to the receiver member by interposing a light-absorbing baffle.

6. The method according to claim 5, further including the step of forming the launcher member, the interposed light-absorbing baffle, and the receiver member into an integral transducer unit having a common convex spherical surface thereon for contacting the refractive surface.

7. Apparatus for inspecting a piece of glass for the presence of an outer surface treated layer on a convexly curved refractive surface of the piece of glass, where the outer surface treated layer has an index of refraction for a ray of first principal polarization which is equal to or lower than the index of refraction of the interior of the piece of glass, the index of refraction for a ray of a second principal polarization in the outer surface treated layer being higher than the index of refraction for a ray at the first principal polarization, the apparatus comprising:

a launcher member placed in contact with the convexly curved refractive surface, the launcher member being formed of an optical material having a higher index of refraction than the outer surface treated layer for any ray of principal polarization;

a first amount of an optically clear intermediate fluid disposed between the refractive surface and the launcher member to create good optical contact therebetween, the intermediate fluid having an index of refraction higher than the index of refraction of the outer surface treated layer for any ray of principal polarization, the fluid forming a first interface with the outer surface treated layer;

a light source for generating a beam of light which impinges on an entrance window on the launcher member;

means for adjusting the direction of the beam of light both within and without the launcher member to cause rays in the beam of light to approach the first interface at an angle between the critical angles of total internal reflection for rays of the first and second principal polarizations as determined by the refractive indices of the optically clear intermediate fluid and the outer surface treated layer for the rays of the first and second principal polarizations;

a receiver placed in contact with the convexly curved refractive surface, the receiver member being formed of an optical material having a higher index of refraction than the outer surface treated layer for any ray of principal polarization;

a second amount of the optically clear intermediate fluid disposed between the convexly curved refractive surface and the receiver member to create good optical contact therebetween, a second interface being formed between the second amount of the optically clear intermediate fluid and the refractive surface;

the receiver member being aligned with any rays of the first principal polarization from the beam refracted at nearly grazing refraction at the first interface and passing through the outer surface treated layer, the radiation entering through the second interface and passing through the receiver member;

a polarizer positioned with its plane essentially normal to the rays passing through the receiver member, the polarizer being oriented such that rays of the first principal polarization are absorbed; and means for detecting the presence of any radiation passing through the polarizer, the presence thereof indicating that no outer surface treated layer is present on the piece of glass.

8. The apparatus according to claim 7 wherein the rays of first principal polarization are ordinary rays and the rays of second principal polarization are extraordinary rays, the index of refraction for the ordinary rays being less than the index of refraction of the interior of the piece of glass.

9. The apparatus according to claim 8, wherein the surfaces of the launcher and receiver members which are emplaced on the ophthalmic lens are convex spherical surfaces.

10. The apparatus according to claim 9, wherein means are included for preventing any light from passing from the launcher member to the receiver member other than through the outer surface treated layer.

11. The apparatus according to claim 10, wherein light is prevented from passing from the launcher member to the receiver member by an interposed light-absorbing baffle.

12. The apparatus according to claim 11, in which the launcher member, the interposed light-absorbing baffle, and the receiver member are joined together into an integral transducer member, the contacting surfaces of the launcher member and receiver member portions of the transducer member are formed as a common spherical surface.

13. The apparatus according to claim 12, in which the interposed light-absorbing baffle also forms a portion of the common spherical surface with the launcher and receiver members.

14. The apparatus according to claim 13, wherein the entrance window on the launcher and an exit window on the receiver are a pair of parallel end face windows formed on the transducer member, for the passing of light into and out of the transducer member.

* * * * *